(12) United States Patent
Hösle et al.

(10) Patent No.: US 6,368,244 B1
(45) Date of Patent: Apr. 9, 2002

(54) BOWL MILL TRANSMISSION

(75) Inventors: Helmut Hösle, Diedorf; Toni Weiss, München; Heinrich Arndt, Augsburg, all of (DE)

(73) Assignee: RENK Aktiengesellschaft, Augsburg (DE)

( * ) Notice: Subject to any disclaimer, the term of this patent is extended or adjusted under 35 U.S.C. 154(b) by 0 days.

(21) Appl. No.: 09/552,504

(22) Filed: Apr. 19, 2000

(30) Foreign Application Priority Data

Apr. 19, 1999 (DE) .......................... 199 17 607

(51) Int. Cl.[7] .............................. F16H 1/28; B02C 15/00
(52) U.S. Cl. ........................................ 475/337; 241/110
(58) Field of Search .................................. 475/337, 343, 475/346, 331; 241/110, 117, 121

(56) References Cited

U.S. PATENT DOCUMENTS

| | | | | |
|---|---|---|---|---|
| 4,210,291 A | * | 7/1980 | Kienast | 241/110 |
| 4,391,163 A | | 7/1983 | Benthake et al. | |
| 4,471,671 A | * | 9/1984 | Sigg | 475/343 |
| 4,887,489 A | * | 12/1989 | Sigg | 475/343 |
| 5,616,098 A | * | 4/1997 | Katayama et al. | 475/346 |

FOREIGN PATENT DOCUMENTS

| | | | |
|---|---|---|---|
| DE | 27 07 699 | | 8/1978 |
| DE | 2716025 | * | 10/1978 |
| DE | 3302049 A1 | * | 7/1984 |
| DE | 19917609 A1 | * | 11/2000 |
| GB | 2123315 A | * | 1/1984 |
| JP | 3-282045 A | * | 12/1991 |
| JP | 8-71440 A | * | 3/1996 |
| JP | 10-314608 A | * | 12/1998 |

OTHER PUBLICATIONS

Article entitled "Kegelrad–Planetengetriebe KPAV für vertikale Wälzmühlen" appearing in RENK TACKE dated Dec. 16, 1999. 8 pages.
Article appearing in Zement–Kalk–Gips, dated 1981, 3 pages.

* cited by examiner

*Primary Examiner*—Charles A Marmor
*Assistant Examiner*—Ankur Parekh
(74) *Attorney, Agent, or Firm*—Cohen, Pontani, Lieberman & Pavane

(57) ABSTRACT

A bowl mill transmission which has a high overall transmission ratio and a high output torque, is of compact construction and is simple to assemble, is equipped with a vertically arranged bevel-gear stage for power input and a multi-stage epicyclic transmission arrangement for power output into a thrust ring of the bowl mill.

24 Claims, 3 Drawing Sheets

BOWL MILL TRANSMISSION

BACKGROUND OF THE INVENTION

1. Field of the Invention

The present invention relates to bowl mill transmissions, and particularly to a bowl mill transmission with a vertically arranged bevel-gear stage for power input and a multi-stage epicyclic transmission arrangement for power output to a thrust ring of a bowl-mill crusher.

2. Description of the Related Art

The invention is based on bowl mills which are driven by vertical bevel-gear transmissions.

The prior art includes drives of this kind (e.g., Renk Tacke company publication Kegelrad-Planetengetriebe KPAV für vertikale Wälzmühlen [Epicyclic bevel-gear transmissions for vertical roller mills]) in which the bevel-gear stage outputs power into the sun gear of an epicyclic transmission with a fixed annulus. In such transmissions, power output to the grinding bowl is via the planet carrier, which accommodates a plurality of planet gears for power transmission.

The grinding process in such mills requires high power transmission to the grinding stock at low speeds of rotation and high torque. The high transmission ratios required for this purpose are limited by the maximum possible diameter of the transmission stage and the diameter of the horizontal bevel gear. The diameter of the epicyclic stage is limited by the transmission housing which passes the grinding forces into the mill foundation by direct force transmission.

Developments of such drives embody two epicyclic stages. Here, the bevel-gear transmission drives a first sun pinion of a first epicyclic transmission stage. A second epicyclic transmission stage is driven by means of a rotationally fixed connection of the planet carrier, which rotates in the fixed annulus, to a further sun gear, which is arranged axially above the first sun gear. This second epicyclic stage is arranged axially above and concentrically to the first. By way of a further planet carrier, which revolves in a further fixed annulus by means of its planet gears, which are provided for power splitting, it outputs power into the grinding bowl. Transmissions of this kind comprise a plurality of individual parts, which are assembled together in a complex manner. A considerable outlay for bearings is furthermore required and assembly of the many individual parts is difficult.

SUMMARY OF THE INVENTION

It is accordingly an object of the invention to provide a transmission which has a high overall transmission ratio with a large output torque, is of compact construction, and is simple to assemble.

According to the invention, this object is achieved by providing a bowl mill transmission with a vertically arranged bevel gear stage for power input and a multi-stage epicyclic transmission arrangement for power output into a thrust ring. The epicyclic transmission arrangement is arranged in the interior of a one-piece annulus holder. In an aspect of the invention, an epicyclic transmission stage of the epicyclic transmisson arrangement is guided by a bearing which is arranged vertically between annuluses in the interior of the annulus holder.

By virtue of the compact epicyclic-stage unit according to the invention, the transmission can to a very large extent be preassembled, making assembly easier.

By virtue of the advantageous modular arrangement of the drive elements, the transmission according to the invention can be constructed and dismantled in stages. With the advantageous integration of the power output stage into the interior of the thrust plate, it is possible to achieve lower overall heights by means of the invention.

By virtue of the advantageous drive configuration, the number of components is reduced, thereby allowing transmissions according to the invention to be produced at lower cost.

While maintaining grinding performance, more compact plants with a significantly lower weight can be achieved with the transmission arrangement according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein,

BRIEF DESCRIPTION OF THE DRAWINGS

In the drawings, wherein like reference numerals denote similar elements.

DETAILED DESCRIPTION OF THE PREFERRED EMBODIMENT

Figure 1:
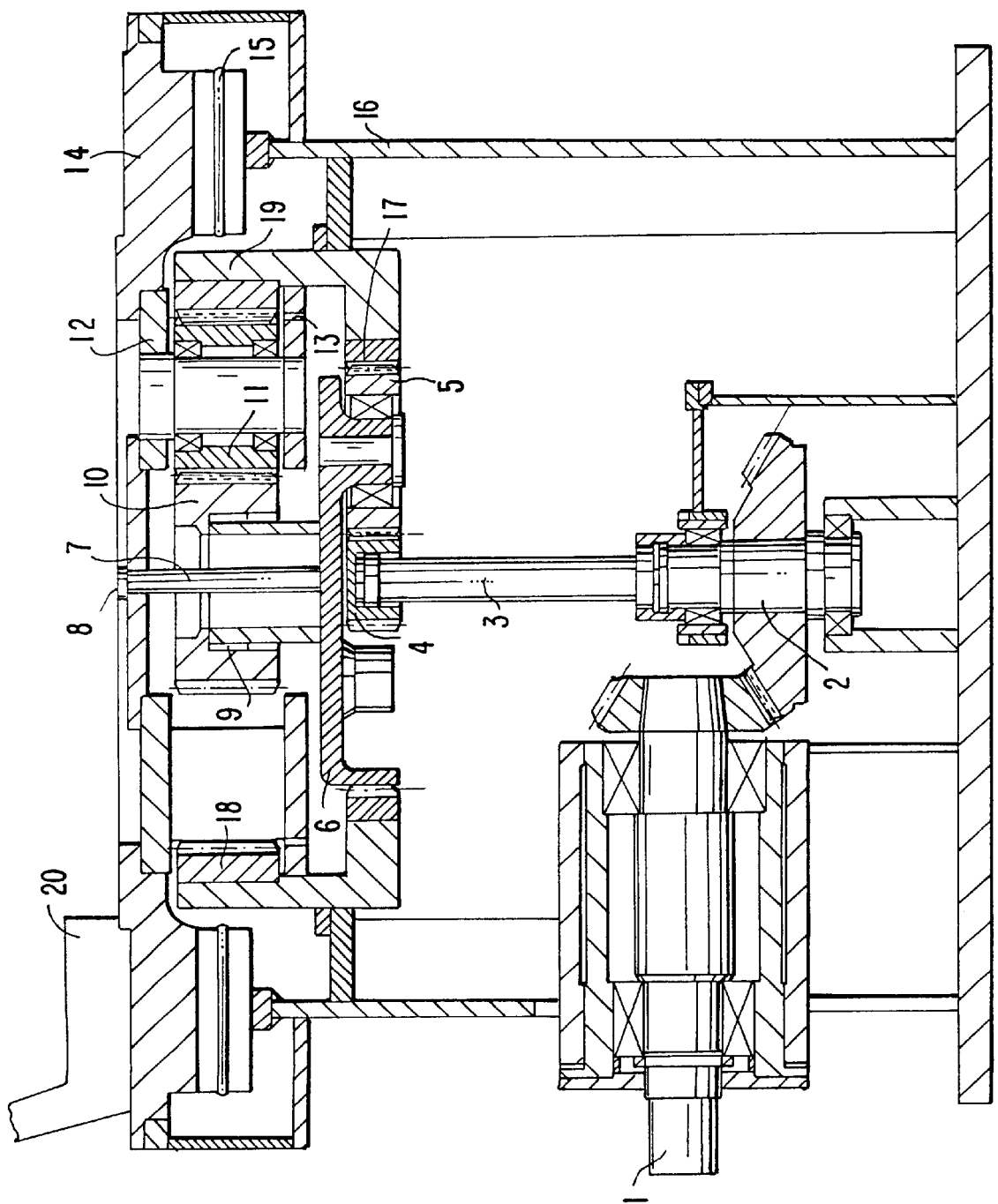
FIG. 1 is a view of the transmission according to the invention.

Power input is by means of the drive shaft 1, which is connected at one end to an electric motor, for example, and carries a bevel gear at its other end. The drive motor has not been shown here. The drive shaft 1 is installed with a complete bearing unit in an insert in the housing 16. By means of tooth engagement with a horizontal bevel gear, the driving power is transmitted to the vertical bevel-gear shaft 2 of the angular transmission. To support the axial and radial forces, the vertical bevel-gear shaft 2 is held above and below the bevel gear by bearings, which are secured on the housing. The shaft end projecting above the upper bearing is connected in a rotationally fixed manner to a sun gear 4 by a coupling 3. The coupling 3 is preferably a toothed coupling.

The sun gear 4 is centered in an overhung manner (i.e., without radial support) between the planet gears 5. The revolving planet gears 5 are rotatably mounted in the planet carrier 6. The planet carrier 6 is guided in the radial direction by means of the planet gears 5 meshing with the annulus 17 and its entire weight hangs from a tie bar 7 which is secured on a tie-bar holder (8) mounted rotatably in the planet carrier 12 of the upper epicyclic stage. Mounted at the end of a cylindrical extension of the planet carrier 12 is a toothed coupling 9 which transmits the torque to the sun pinion 10 of the upper epicyclic transmission stage. The planet gears 11 meshing with the sun pinion 10 centered in an overhung manner (i.e., without radial support) roll within the fixed annulus 18. The planet carrier 12, on which the planet gears 11 are rotatably mounted, revolves and with it the thrust ring 14, on which it is directly secured in a rigid manner. The thrust ring 14 takes the form of a circular disc which projects only slightly in the radial direction beyond the thrust bearings 15, which are arranged in a ring pattern, and is significantly thinner than a thrust plate which is customarily installed. The thrust ring 14 bears the weight of the upper output planet carrier 12 and of the transmission elements of the lower stage which are suspended on the carrier. The thrust ring 14 transmits the weight-associated forces acting on it and the axial forces resulting from the grinding process in the bowl mill 20 secured on it into the housing 16 via the thrust bearings 15.

These very large axial forces are introduced into the foundation by the housing 16 via direct force transmission. The thrust bearings 15 are embodied as hydrodynamic or hydrostatic bearings or as a combination of the two types of bearing, depending on the overall size of the mill and the grinding pressure which occurs. The thrust ring 14 is supported radially via the planet carrier 12, which is guided at its lower end in a bearing 13. In the vertical direction, the bearing 13 is mounted between the annuluses 17, 18 in the interior of the annulus holder 19 and is preferably embodied as a sliding-contact bearing.

The one-piece annulus holder 19 represents a compact unit which is inserted complete into the housing 16 and connected in a rotationally fixed manner together with the annuluses 17, 18, which are preferably shrunk in and additionally secured in a form-fitting manner, e.g. by means of keys. The annuluses 17, 18 are of the same diameter, thereby ensuring that the annulus holder 19 has a simple configuration.

If different annulus diameters are desired, the smaller annulus must be produced from a hollow cylinder with a greater wall thickness to maintain the shape of the annulus holder 19.

The epicyclic stages running in the annuluses 17, 18 are likewise compact units which are each installed as complete units.

Figure 2:
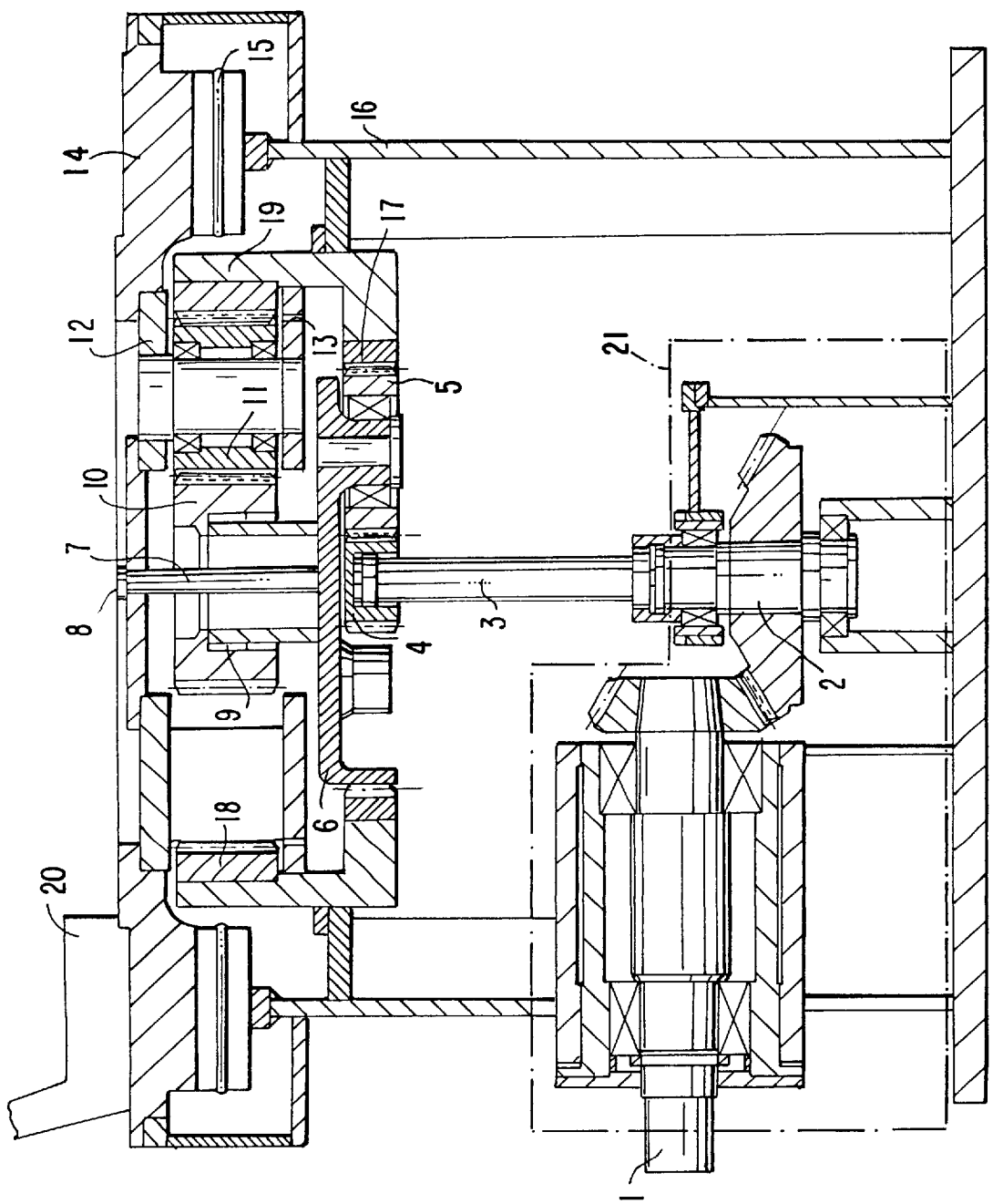
FIG. 2 is a view of a second embodiment of the transmission.

In another embodiment shown in FIG. 2, the bevel-gear transmission stage 1, 2 is provided as a complete module with its own vertical housing 21.

A complete module of this kind can be inserted through a tunnel leading radially into the housing 16 and positioned under the raised sun gear 4. The sun gear 4 is connected to the bevelgear shaft 2 by means of the coupling 3 by lowering the sun gear 4, this being performed, like the raising process, from above by means of lifting gear.

Figure 3:
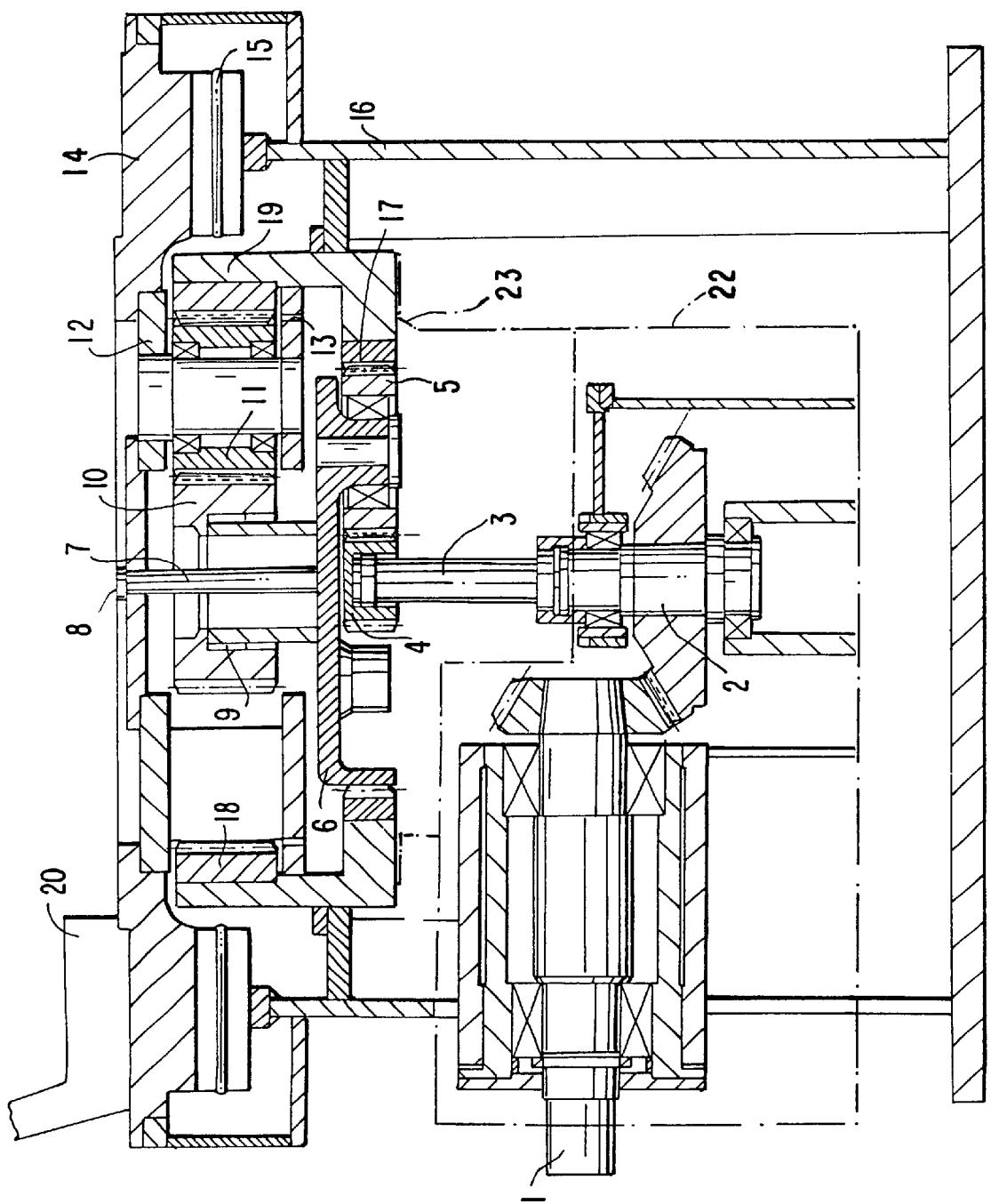
FIG. 3 is a view of a third embodiment.

In another design configuration shown in FIG. 3, a module of this kind belonging to the bevel-gear transmission stage 1, 2 is embodied with a flanged housing 22. By means of flanges 23, the flanged housing 22 is flanged as a compact unit to the annulus holder 19, and the coupling 3 connects the bevel-gear shaft 2 to the sun gear 4. To simplify assembly, both the vertical housing 21 and the flanged housing 22 can be embodied in several parts. It is thereby possible to partially disassemble these units, even after they have been installed. This allows maintenance or repair work to be carried out easily.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A bowl mill transmission, comprising: a thrust ring; a vertically arranged bevel-gear stage for power input; a multi-stage epicyclic transmission arrangement for power output into the thrust ring; and a one-piece annulus holder, the epicyclic transmission arrangement including annuluses and being arranged in an interior of the one-piece holder.

2. A bowl mill transmission according to claim 1, wherein the annuluses have a common diameter and are each shrunk fit into the annulus holder.

3. A bowl mill transmission according to claim 1, wherein the epicyclic transmission arrangement has parts arranged in an interior of the thrust ring.

4. A bowl mill transmission according to claim 1, and further comprising a transmission output stage fixedly connected to the thrust ring so that torque is output directly via the fixed connection between the transmission output stage and the thrust ring.

5. A bowl mill transmission according to claim 1, wherein the epicyclic transmission arrangement includes a stage which is arranged at a bottom in a vertical direction and is secured on an epicyclic stage arranged at the top so as to allow relative movements in a circumferential direction.

6. A bowl mill transmission according to claim 1, wherein the epicyclic transmission arrangement includes the sun gears without radial support.

7. A bowl mill transmission according to claim 1, wherein the bevel-gear stage is couplable to and decouplable from the epicyclic transmission arrangement as a complete unit without removing the epicyclic transmission arrangement.

8. A bowl mill transmission according to claim 7, wherein the bevel-gear stage includes a vertical bevel-gear shaft, the epicyclic transmission arrangement including a sun gear, the sun gear and the vertical bevel-gear shaft being connected by a releasable rotationally fixed connection.

9. A bowl mill transmission according to claim 8, wherein the rotationally fixed connection between the sun gear and the vertical bevel-gear shaft is a toothed coupling.

10. A bowl mill transmission according to claim 7, and further comprising a housing having a tunnel, the bevel-gear stage being insertable as a complete unit laterally into the tunnel in the housing.

11. A bowl mill transmission according to claim 7, wherein the bevel-gear stage has a housing flanged to the epicyclic transmission arrangement.

12. A bowl mill transmission according to claim 11, wherein the housing of the bevel-gear stage is composed of several detachable parts.

13. A bowl mill transmission according to claim 1, and further comprising a bearing arranged vertically between the annuluses in the interior of the annulus holder, the epicyclic transmission arrangement including an epicyclic transmission stage guided by the bearing.

14. A bowl mill transmission according to claim 13, wherein the bearing is a sliding-contact bearing.

15. A bowl mill transmission according to claim 13, wherein the annuluses have a common diameter and are each shrunk fit into the annulus holder.

16. A bowl mill transmission according to claim 13, and further comprising a transmission output stage fixedly connected to the thrust ring so that torque is output directly via the fixed connection between the transmission output stage and the thrust ring.

17. A bowl mill transmission according to claim 13, wherein the epicyclic transmission arrangement includes a stage which is arranged at a bottom in a vertical direction and is secured on an epicyclic stage arranged at the top so as to allow relative movements in a circumferential direction.

18. A bowl mill transmission according to claim 13, wherein the epicyclic transmission arrangement includes sun gears without radial support.

19. A bowl mill transmission according to claim 13, wherein the bevel-gear stage is couplable to and decouplable from the epicyclic transmission arrangement as a complete unit without removing the epicyclic transmission arrangement.

20. The bowl mill transmission according to claim 19, wherein the bevel-gear stage includes a vertical bevel-gear shaft, the epicyclic transmission arrangement including a sun gear, the sun gear and the vertical bevel-gear shaft being connected by a releasable rotationally fixed connection.

21. A bowl mill transmission according to claim 20, wherein the rotationally fixed connection between the sun gear and the vertical bevel-gear shaft is a toothed coupling.

22. A bowl mill transmission according to claim 19, and further comprising a housing having a tunnel, the bevel-gear stage being insertable as a complete unit laterally into the tunnel in the housing.

23. A bowl mill transmission according to claim 19, wherein the bevel-gear stage has a housing flanged to the epicyclic transmission arrangement.

24. A bowl mill transmission according to claim 23, wherein the housing of the bevel-gear stage is composed of several detachable parts.

* * * * *